US012619081B2

(12) United States Patent
Miyajima et al.

(10) Patent No.: US 12,619,081 B2
(45) Date of Patent: May 5, 2026

(54) OPTICAL SYSTEM AND DISPLAY APPARATUS

(71) Applicant: CANON KABUSHIKI KAISHA, Tokyo (JP)

(72) Inventors: Yu Miyajima, Tochigi (JP); Yuma Kobayashi, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 371 days.

(21) Appl. No.: 18/520,688

(22) Filed: Nov. 28, 2023

(65) Prior Publication Data

US 2024/0210700 A1      Jun. 27, 2024

(30) Foreign Application Priority Data

Dec. 27, 2022      (JP) ................................. 2022-209721

(51) Int. Cl.
G02B 27/01 (2006.01)
(52) U.S. Cl.
CPC ................................ G02B 27/0172 (2013.01)
(58) Field of Classification Search
CPC ........................ G02B 27/0172; G02B 27/4211
See application file for complete search history.

(56) References Cited

U.S. PATENT DOCUMENTS

| | | | |
|---|---|---|---|
| 10,012,938 B2 | 7/2018 | Miyajima | |
| 10,054,790 B2 | 8/2018 | Miyajima | |
| 2016/0202393 A1 | 7/2016 | Miyajima | |
| 2023/0244065 A1 | 8/2023 | Kobayashi | |

FOREIGN PATENT DOCUMENTS

JP            7103566 B2      7/2022

*Primary Examiner* — Jack Dinh
(74) *Attorney, Agent, or Firm* — Carter, DeLuca & Farrell LLP

(57) ABSTRACT

An optical system guides a light beam from an image display element to an exit pupil and includes, in order from an exit pupil side to an image display element side, a first transmissive reflective surface, a second transmissive reflective surface, and an optical element disposed closer to the exit pupil than the first transmissive reflective surface. The optical element includes, in order from the exit pupil side to the image display element side, a first optical element made of a first optical material and a second optical element made of a second optical material different from the first optical material. The first and second optical elements are cemented together, and a diffraction grating is formed on a cemented surface. The diffraction grating includes a grating surface and a grating wall surface, the grating surface having a convex shape facing the image display element side. A predetermined inequality is satisfied.

14 Claims, 4 Drawing Sheets

OPTICAL SYSTEM AND DISPLAY APPARATUS

BACKGROUND

Technical Field

One of the aspects of the embodiments relates to an optical system, and is suitable for a display apparatus that enlarges and displays an original image displayed on an image display element such as a head mount display (HMD).

Description of Related Art

The conventional optical system provided in a display apparatus such as an HMD is demanded to have a reduced overall length. A bending optical system is known as an optical system that can reduce the overall length. Japanese Patent No. 7103566 discloses a bending optical system using a diffractive optical element (DOE) to improve the sense of the definition of an image.

However, Japanese Patent No. 7103566 places the DOE between the surface on the side of the image display element of the optical system and the image display surface of the image display element, and cannot sufficiently correct lateral chromatic aberration among senses relating to the definition of an image.

SUMMARY

An optical system according to one aspect of the embodiment is configured to guide a light beam from an image display element to an exit pupil and includes, in order from an exit pupil side to an image display element side, a first transmissive reflective surface, a second transmissive reflective surface, and an optical element disposed closer to the exit pupil than the first transmissive reflective surface. The optical element includes, in order from the exit pupil side to the image display element side, a first optical element made of a first optical material and a second optical element made of a second optical material different from the first optical material. The first optical element and the second optical element are cemented together, and a diffraction grating is formed on a cemented surface of the first optical element and the second optical element. The diffraction grating includes a grating surface contributing to diffraction and a grating wall surface adjacent to the grating surface in a radial direction, the grating surface having a convex shape facing the image display element side. The following inequalities are satisfied:

$$0.5 \le d1 \le 20.0$$

$$0.02 \le d2 \le 0.40$$

where d1 [mm] is a thickness of the first optical material in an optical axis direction, and d2 [mm] is a thickness of the second optical material in the optical axis direction. A display apparatus having the above optical system also constitutes another aspect of the embodiment.

Further features of the disclosure will become apparent from the following description of embodiments with reference to the attached drawings.

DESCRIPTION OF THE EMBODIMENTS

Figure 1:
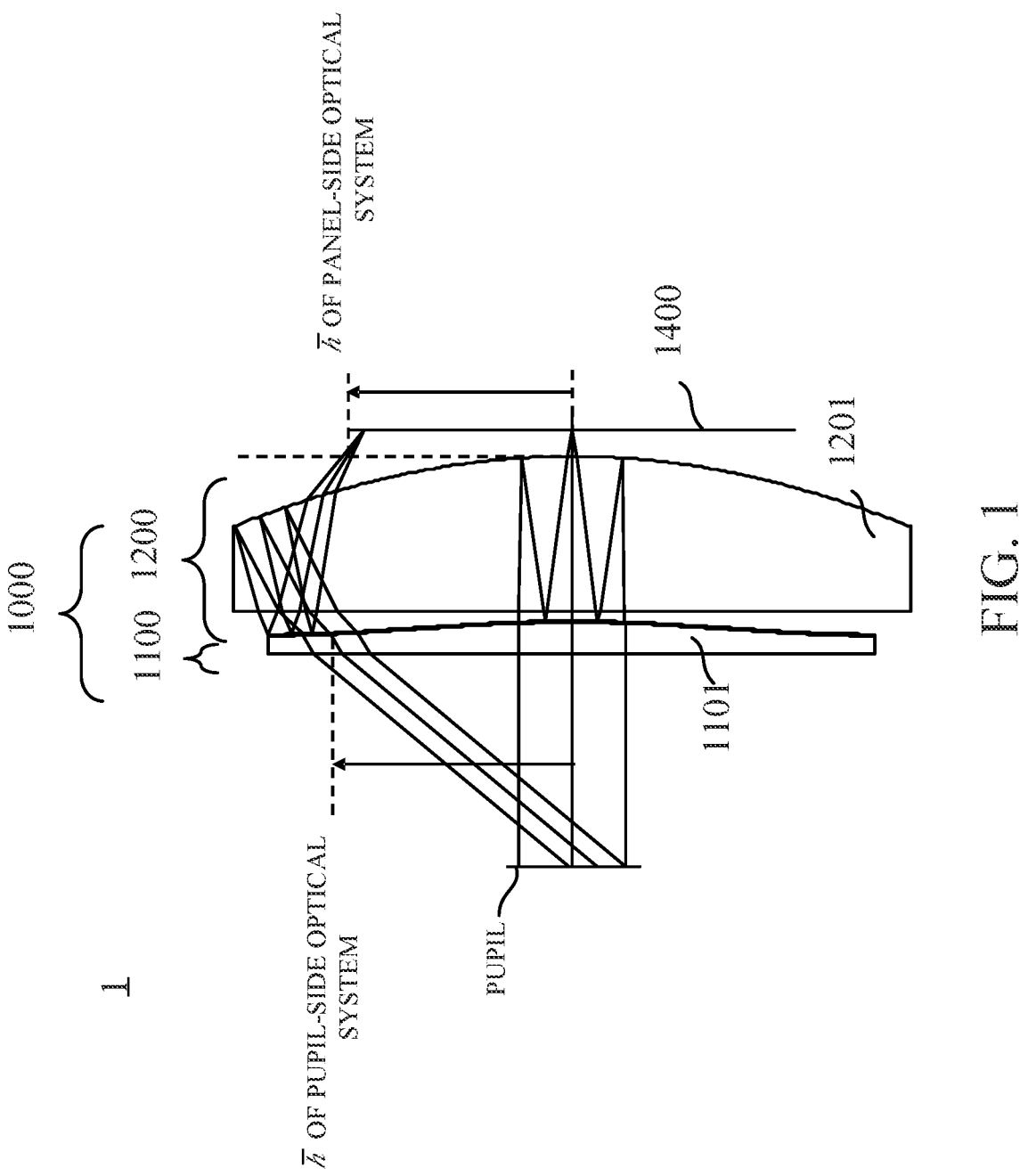
FIG. 1 is a sectional view of an observation apparatus according to this embodiment.

Referring now to the accompanying drawings, a detailed description will be given of embodiments according to the disclosure. Corresponding elements in respective figures will be designated by the same reference numerals, and a duplicate description thereof will be omitted.

Overview

FIG. 1 is a sectional view of an observation apparatus (display apparatus) 1 according to this embodiment. The observation apparatus 1 includes an observation optical system (optical system) 1000 and a panel unit 1400. The observation optical system 1000 is a bending optical system configured to guide a light beam from the panel unit 1400 to the exit pupil. The panel unit 1400 includes, for example, an image display element (light modulation element) such as a liquid crystal display element (LCD) and an organic EL element. The observation optical system 1000 includes, in order from the exit pupil side to the image display element side, a first transmissive reflective surface and a second transmissive reflective surface. The first transmissive reflective surface and the second transmissive reflective surface may be polarization separation (splitting) surfaces.

The observation optical system 1000 includes, in order from the exit pupil side to the image display element side, a pupil-side optical system 1100 and a transmissive reflective optical system 1200. The transmissive reflective optical system 1200 includes a first transmissive reflective surface and a second transmissive reflective surface. In this embodiment, each of the pupil-side optical system 1100 and the transmissive reflective optical system 1200 includes optical elements 1101 and 1201. The optical elements 1101 and 1201 refract, reflect, or diffract a light ray.

The optical element 1101 includes, in order from the exit pupil side to the image display element side, surfaces R1, R2, and R3. The surfaces R1, R2, and R3 are a plane, a curved surface with a diffraction grating, and a curved surface having the same shape as that of the surface R2 and no diffraction grating. The optical element 1201 includes, in order from the exit pupil side to the image display element side, surfaces R4 and R5. The surfaces R4 and R5 are a plane and a curved surface, respectively.

The light beam from the panel unit 1400 is reflected once on each of the two transmissive reflective surfaces, passes through the pupil-side optical system 1100, and travels toward the exit pupil. Thereby, the observation optical system 1000 can observe the optical image of the original image displayed on the panel unit 1400 from the user's pupil where the exit pupil is located. The light that follows the optical path at this time will be referred to as desired light, and the other light will be referred to as unnecessary light.

Figure 2:
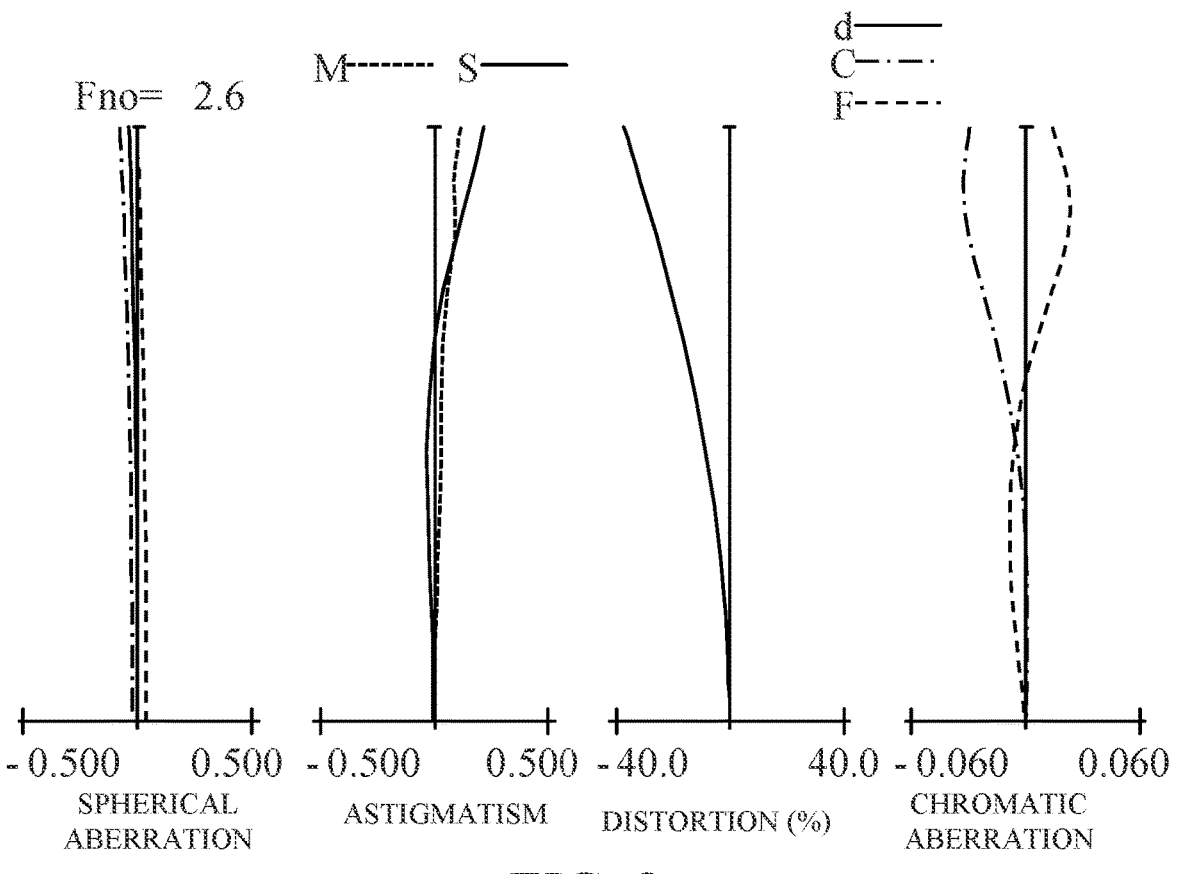
FIG. 2 is an aberration diagram of an observation optical system.

FIG. 2 is an aberration diagram of the observation optical system 1000 in a case where the eye relief (distance on the optical axis from the pupil to the surface closest to the pupil of the pupil-side optical system 1100) is 12 mm and a virtual image is displayed at a position 1600 mm away from the pupil. FIG. 2 illustrates aberrations with the panel unit 1400 as the image plane not in the original forward optical path (forward tracing) from the panel unit 1400 to the pupil, but in the reverse optical path (reverse tracing) from the pupil to the panel unit 1400. However, in illustrating the optical performance of the observation optical system 1000, this is not a problem because they correspond to the aberrations in the case of the forward optical path (forward tracing).

In the spherical aberration diagram, Fno represents an F-number. The spherical aberration diagram indicates spherical aberration amounts for the C-line (wavelength of 656.3 nm) and the F-line (wavelength of 486.1 nm). In the astigmatism diagram, S indicates an astigmatism amount on the sagittal image plane, and M indicates an astigmatism amount on the meridional image plane. The distortion diagram illustrates a distortion amount for the d-line (587 nm). The chromatic aberration diagram illustrates chromatic aberration amounts for the C-line and the F-line. ω indicates an imaging half angle of view (°).

In a case where the panel unit 1400 includes an image display element such as an Original Light Emitting Diode (OLED) or an LCD, electrical processing may be added to the panel unit 1400 depending on the distortion amount and the lateral chromatic aberration amount.

DESCRIPTION OF COMPONENTS

Figure 3:
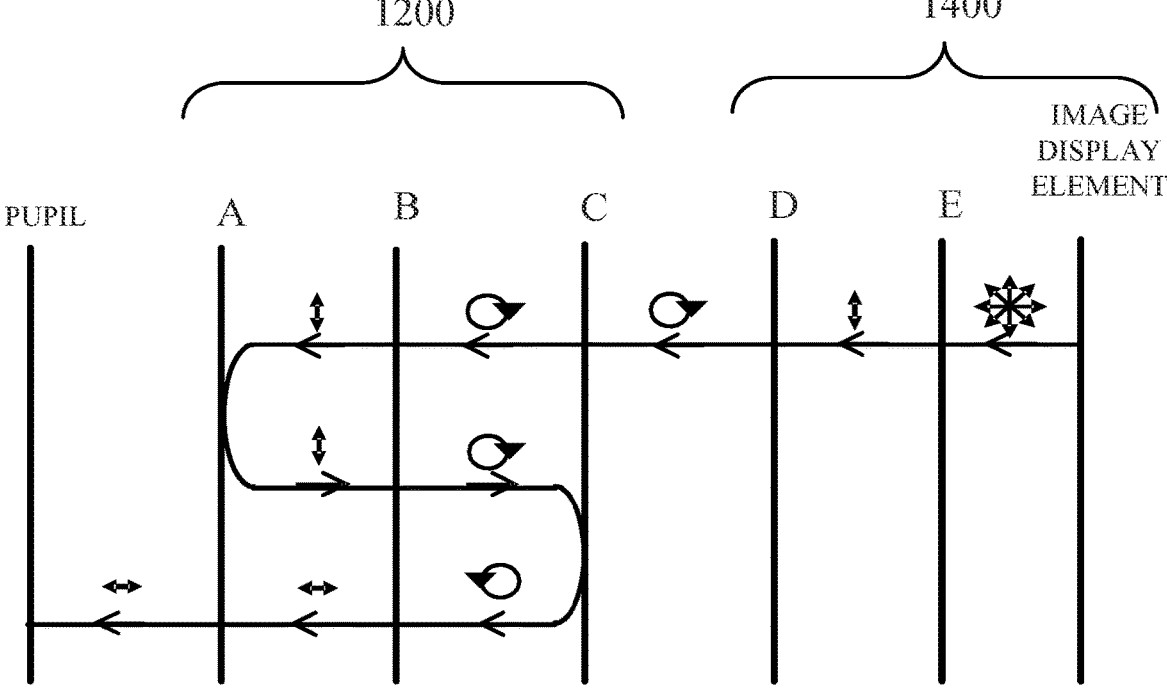
FIG. 3 is a schematic diagram illustrating an optical path of the observation optical system.

Referring now to FIGS. 1 and 3, a description will be given of the components and optical path of the observation optical system 1000. FIG. 3 is a schematic diagram illustrating the optical path of the observation optical system 1000. FIG. 3 illustrates the direction of the optical path and the polarization state. In order to explain the gist of this embodiment, the optical path of the desired light will be described, and a description of the optical path of the unnecessary light caused by the components will be omitted.
Components The panel unit 1400 includes, in order from the exit pupil side to the image display element side, a second quarter waveplate D, a polarizing plate E, and an image display element. The image display element has a square shape with a diagonal length of 1.3 inches (23.3 mm on each side).
Optical Path The unpolarized light beam emitted from the image display element becomes linearly polarized light by the polarizing plate E, is converted into circularly polarized light by the second quarter waveplate D, and then travels toward the transmissive reflective optical system 1200.

The polarizing plate E may be integrated with the image display element. For example, many liquid crystal display elements include polarizing plates in their configuration. In organic EL elements, polarizing plates are sometimes used for the purpose of preventing reflection. In such a case, since the light from the image display element 103 is already linearly polarized, it is not always necessary to use the polarizing plate E.
Components The transmissive reflective optical system 1200 includes, in order from the exit pupil side to the image display element side, a polarization-selective half-transmissive reflective element A, a first quarter waveplate B, and an optical element 1201. The first quarter waveplate B is bonded to the surface R4 on the exit pupil side of the optical element 1201. A half-transmissive reflective surface (half-mirror) C is deposited on the surface R5 on the image display element side of the optical element 1201. The half-transmissive reflective surface C is formed, for example, by a dielectric multilayer film or metal vapor deposition. In this embodiment, the polarization-selective half-transmissive reflective element A functions as a first transmissive reflective surface, and the half-transmissive reflective surface C functions as a second transmissive reflective surface.

The polarization-selective half-transmissive reflective element A is configured to reflect linearly polarized light having the same polarization direction as that of light that has passed through the polarizing plate E and to transmit linearly polarized light having a polarization direction perpendicular to that of the light that has passed through the polarizing plate E. The polarization-selective half-transmissive reflective element A is, for example, a wire grid polarizer or a laminated birefringent film polarizer. A specific example of the wire grid polarizer is "WGF" (registered trademark) manufactured by Asahi Kasei Corporation, in which the wire grid forming surface functions as a half-transmissive reflective surface. Since it is difficult to affix such a film-like element onto a diffraction grating with high accuracy, the surface having the diffraction grating and the surface having the polarization-selective half-transmissive reflective element A may be different surfaces. In this embodiment, the polarization-selective half-transmissive reflective element A is bonded to the surface R3 of the optical element 1101. The polarization-selective half-transmissive reflective element A is bonded to the surface R3 of the optical element 1101 but is included in the transmissive reflective optical system 1200.

The first quarter waveplate B is disposed so that its slow axis of tilted by 90 degrees relative to the slow axis of the second quarter waveplate D, and is tilted by 45 degrees relative to the polarized light transmission axis of the polarizing plate E.
Optical Path The desired light among the light incident on the half-transmissive reflective surface C transmits through the half-transmissive reflective surface C, is converted into linearly polarized light in the same polarization direction as that of light that has passed through the polarizing plate E by the first quarter waveplate B, and enters the polarization-selective half-transmissive reflective element A. The linearly polarized light is reflected by the polarization selectivity of the polarization-selective half-transmissive reflective element A. The light reflected by the polarization-selective half-transmissive reflective element A is converted by the first quarter waveplate B into circularly polarized light, which is the same as that of the light that was first converted into circularly polarized light by the second quarter waveplate D, and enters and is reflected by the half-transmissive reflective surface C. The light reflected by the half-transparent reflective surface C becomes circularly polarized light in the opposite direction to the pre-reflection light, and enters the first quarter waveplate B again, where the polarization direction is converted into linearly polarized light having a polarization direction perpendicular to that of the light that has first passed through the polarizing plate E, and enters the polarization-selective half-transmissive reflective element A. The linearly polarized light transmits through the polarization-selective half-transmissive reflective element A due to the polarization selectivity of the polarization-selective half-transmissive reflective element A, and is guided to the pupil.
Diffraction Grating of Pupil-Side Optical System This embodiment provides a diffraction grating on the surface R2 of the optical element 1101, and reduces lateral chromatic aberration.

Since a general observation optical system is designed to permit distortion, a height h̄ (harbor) of a principal ray of an off-axis angle-of-view light beam of the panel unit is smaller than a value obtained by multiplying a focal length f of the observation optical system by a tan off-axis angle θ. Therefore, in a bending optical system that includes the pupil-side optical system, the transmissive reflective optical system, and the panel-side optical system, which are arranged in order from the exit pupil side to the image display element side, the height $\bar{h}$ of the principal ray of the off-axis angle-of-view light beam tends to be larger in order of the transmissive reflective optical system, the pupil-side optical system, and the panel-side optical system.

This embodiment does not provide the panel-side optical system, but if the panel-side optical system is provided, the panel-side optical system would be disposed between the surface R5 of the optical element 1201 and the panel unit 1400. At this time, as illustrated in FIG. 1, the height $\bar{h}$ of the principal ray of the off-axis angle-of-view light beam of the surface R2 of the optical element 1101 is greater than the height $\bar{h}$ of the principal ray of the off-axis angle-of-view light beam of the panel-side optical system.

According to the aberration theory, it is more effective to provide a diffraction grating on the surface where the height $\bar{h}$ of the principal ray of the off-axis angle-of-view light beam from the optical axis is large in terms of the lateral chromatic aberration reducing effect. According to the aberration theory, it is more effective to provide the diffraction grating to the pupil-side optical system 1100 as disclosed in this embodiment than to provide the diffraction grating to the panel-side optical system as disclosed in Japanese Patent No. 7103566. It is not suitable to provide the diffraction grating to the transmissive reflective optical system 1200 from the viewpoint of diffraction efficiency, which will be described below. Therefore, in this embodiment, the pupil-side optical system 1100 has an optical surface with a diffraction grating, rather than the panel-side optical system or the transmissive reflective optical system 1200.

Replica Material

Figures 4A, 4B:
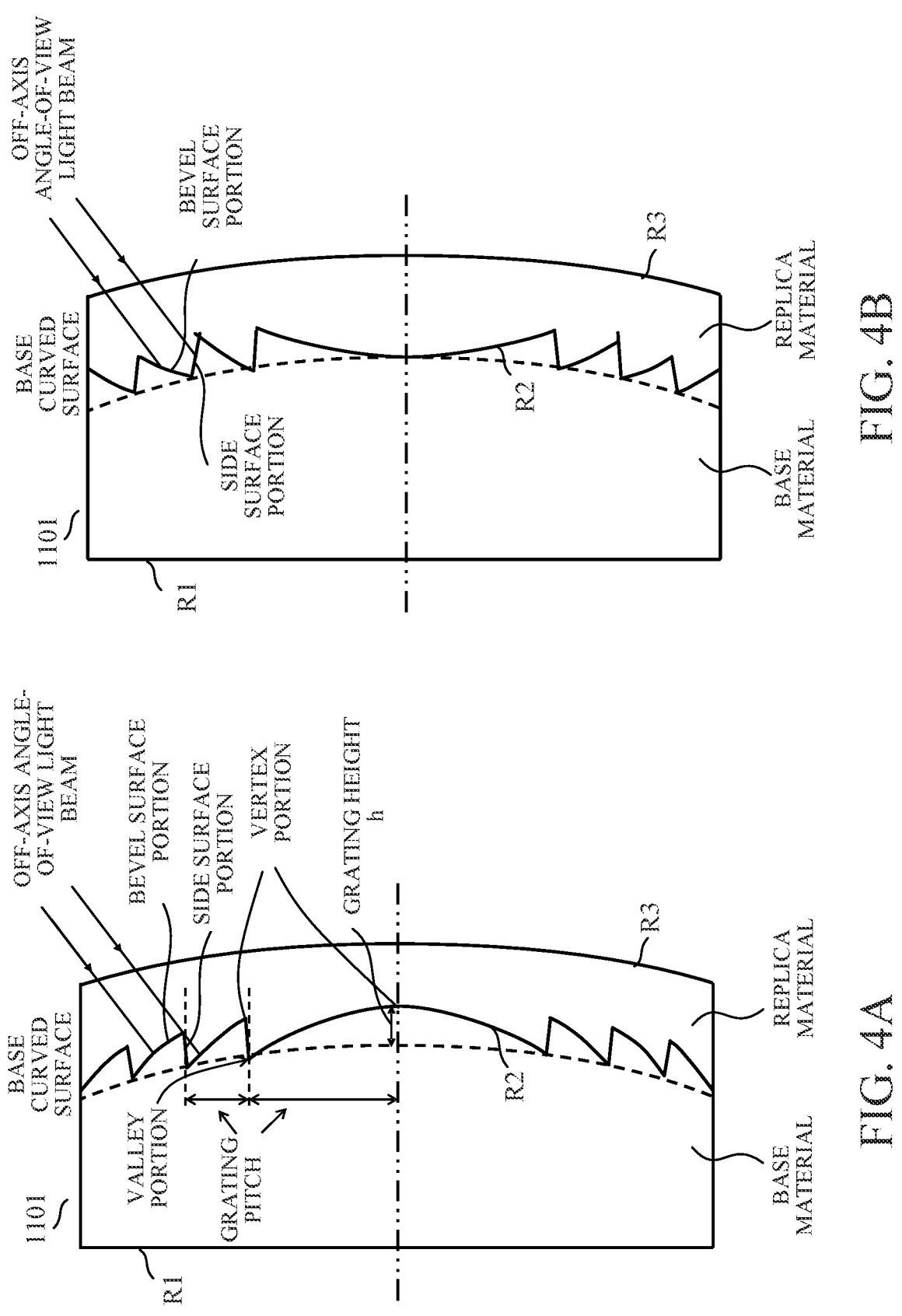
FIGS. 4A and 4B explain an optical element.

FIG. 4A explains the optical element 1101. The optical element 1101 includes, in order from the exit pupil side to the image display element side, a base material (a first optical element made of a first optical material) and an optical coating material (a second optical element made of a second optical material). The surface on the exit pupil side of the base material and the surface on the image display element side of the base material are surfaces R1 and R2, respectively, and the surface of the optical coating material on the image display element side is surface R3. By coating the surface R2 with the optical coating material, the base material and the optical coating material form an integrated lens (optical element 1101).

The optical coating material is a coating material whose main purpose is to improve the optical performance of the base material. If there is no coating with an optical coating material and the diffraction grating contacts an air layer, the diffraction efficiency is good near a specific wavelength, but the diffraction efficiency decreases at wavelengths far from the specific wavelength. This embodiment coats the base material with the optical coating material and acquires good diffraction efficiency in the wavelength range necessary for the observation optical system. In a case where a diffraction grating is provided on each of the base material and the optical coating material (or the base materials, not the optical coating material) and then cemented, the diffraction grating may collapse due to slight misalignment during cementing.

The diffraction grating is formed along the curved surface shape (base curved surface) of the surface R2 illustrated by a dotted line, and the grating height h differs according to the position. In FIG. 4A, a bending point on the base material side of the diffraction grating will be referred to as a valley portion, and a bending points on the optical coating material side will be referred to as a vertex portion. As illustrated in FIG. 4A, the grating height h is a distance on the optical axis between an envelope surface of the valley portion and a boundary of the diffraction grating for the central annulus, and the grating height h is a distance between the valley portion and the vertex portion for other annuli.

Resin Thickness: Non-Pupil-Side Surface

Since the base material is usually selected from a thermoplastic resin, the following inequality (1) is satisfied:

$$0.5 \le d1 \le 20.0 \tag{1}$$

where d1 [mm] is the thickness of the base material in the optical axis direction (center thickness).

In a case where the center wall thickness d1 of the base material becomes is smaller than 0.5 mm, the strength becomes low and manufacturing by molding becomes difficult. In a case where the center wall thickness d1 becomes larger than 20 mm, it becomes difficult to obtain the effect of shortening the overall optical length, which is the main purpose of a bending optical system.

On the other hand, since UV-curable resin is usually selected as the optical coating material, the following inequality (2) is satisfied:

$$0.02 \le d2 \le 0.40 \tag{2}$$

where d2 [mm] is the thickness of the optical coating material in the optical axis direction (center thickness).

In a case where the center thickness d2 of the optical coating material becomes smaller than 0.02 mm, the strength becomes low and manufacturing becomes difficult. In a case where the center thickness d2 becomes larger than 0.40 mm, the UV curing time becomes long and the number of steps increases.

In this embodiment, the center thicknesses of the base material and the optical coating material are 1.72 mm and 0.1 mm, respectively. UV-curable resins generally have low hardness as a resin material and do not have high chemical resistance. Some UV-curable resins have high hardness and high chemical resistance but are not common. Hence, a surface coated with an optical coating material may not be placed on the surface facing the pupil (hereinafter referred to as the pupil-facing surface), which is touched by the observer or wiped with force with chemicals when it becomes dirty. Another method applies a hard coating, which has a main purpose of improving hardness, after coating with the optical coating material, but this method increases the number of steps. This embodiment provides the diffraction grating and coating with the optical coating material on the surface R2, which is a non-pupil-side surface.

Convex on Panel Side

In the pupil-side optical system 1100, the off-axis angle-of-view light beam has an angle relative to the optical axis, as illustrated in FIG. 4A. For this angle, the diffraction grating is disposed so that its convex surface faces the panel unit 1400 in order to improve the diffraction efficiency. More specifically, the diffraction grating includes a bevel surface portion (grating surface) that contributes to diffraction and a side surface portion (grating wall surface) that is adjacent to the bevel surface portion in the radial direction and does not contribute to diffraction, and the grating surface has a convex shape toward to the panel unit 1400. Thereby, the off-axis angle-of-view light beam mainly enters the bevel portion of the diffraction grating, the number of rays entering the side surface portion is reduced, and the diffraction efficiency improves.

FIG. 4B illustrates an optical element 1101 in which the diffraction grating is disposed so that its convex surface faces the exit pupil. In FIG. 4B, many light rays of the off-axis angle-of-view light beam enter the side surface portion of the diffraction grating. Since the light beam incident on the side surface portion does not cause the desired diffraction, the diffraction efficiency of the desired light deteriorates. The light beam incident on the side surface portion becomes unnecessary light and causes deterioration in the performance of the observation optical system 1000. Therefore, the diffraction grating may be disposed so that its convex surface faces the panel unit 1400 side.

A description will now be given of a case where a diffraction grating is provided to the transmissive reflective optical system 1200. Since light rays are reflected by two transmissive reflective surfaces in the transmissive reflective optical system 1200, there are three optical paths of the off-axis angle-of-view light beam, and the incident angle of the light ray to the diffraction grating is different in each optical path. It is difficult to configure all optical paths so that the light rays never hit the side surface portions of the diffraction grating, and thus the diffraction efficiency deteriorates and the unnecessary light increases in one of the optical paths. Thus, a diffraction grating may not be provided to the transmissive reflective optical system 1200.

The above configuration can obtain the effect of reducing lateral chromatic aberration while improving diffraction efficiency and is suitable for practical use that takes into consideration strength and chemical resistance.

A description will now be given of the configuration that may be satisfied in the observation optical system 1000.

A UV curable resin may be used as the optical coating material. A manufacturing method pours liquid UV curable resin onto a base material having a diffraction grating, fixes them with a mold, and then cures them by exposure to UV light. This manufacturing method can manufacture the diffraction grating of the optical coating material so as to transfer the diffraction grating of the base material. As described above, the diffraction grating can be manufactured with higher accuracy than the manufacturing method in which the base material and the optical coating material (or the base materials) are each provided with a diffraction grating and then cemented.

A thermoplastic resin may be used as the base material. Thereby, the base material can be manufactured at a low cost while the highly accurate diffraction grating is realized.

The material of the lens having the pupil-side surface may have pencil hardness of 3H or higher. In this embodiment, the pencil hardness of the synthetic resin of the optical coating material is less than 3H, and the pencil hardness of PMMA (acrylic resin) of the base material is 3H. The pencil hardness of general optical coating materials tends to be less than 3H. In this sense as well, the optical surface of the optical coating material may be a non-pupil-side surface.

A wire grid polarizer may be adhered to a smooth surface of the optical coating material. Thereby, it becomes easier to manufacture the wire grid polarizer. In an attempt to provide a wire grid polarizer without an optical coating material, it becomes difficult to manufacture due to the unevenness of the diffraction grating of the base material.

PMMA, which has higher hardness and higher chemical resistance than ordinary resins, may be used as the base material having the pupil-side surface. Thereby, hard coating or antifouling glass are unnecessary even in cases where antifouling standards are stricter than usual.

A description will now be given of conditions that the observation optical system 1000 may satisfy. The observation optical system 1000 may satisfy one or more of the following inequalities (3) to (10):

$$0.02 < |n1 - n2| < 0.20 \qquad (3)$$

$$5 < |v1 - v2| \qquad (4)$$

$$n1 > n2 \qquad (5)$$

$$v1 > v2 \qquad (6)$$

$$25 < v1 < 60 \qquad (7)$$

$$18 < v2 < 40 \qquad (8)$$

$$0.01 < P\,\text{min} \qquad (9)$$

$$N \le 1000 \qquad (10)$$

Here, n1 is a refractive index of the base material for the d-line. n2 is a refractive index of the optical coating material for the d-line. v1 is an Abbe number v1 of the base material for the d-line. v2 is an Abbe number of the optical coating material for the d-line. Pmin [μm] is a minimum grating pitch of the diffraction grating. The grating pitch is a distance between straight lines parallel to the optical axis passing through adjacent valley portions. However, for the central annulus, it is a distance between the straight line passing through the valley portion and the optical axis. The minimum grating pitch Pmin is the smallest one of the grating pitches. N is the number of annuli in the diffraction grating.

The refractive index difference between the base material and the optical coating material, defined by inequality (3), is a parameter that affects the grating height of the diffraction grating to secure diffraction efficiency. In a case where the value |n1-n2| is larger than 0.02, the grating height becomes approximately 20 μm or less, and in a case where it is smaller than 0.2, the grating height becomes approximately 1 μm or more. In a case where the grating height exceeds 20 μm, the diffraction grating tends to collapse when the base material is released from the mold. The grating height may not be less than 1 μm because the optical coating material becomes difficult to follow the diffraction grating of the base material due to bubbles etc. during application of the optical coating material. That is, the observation optical system 1000 may satisfy the following inequality (3-1):

$$0.001 < h < 0.020 \qquad (3\text{-}1)$$

where h [mm] is a grating height.

The Abbe number difference between the base material and the optical coating material, defined by inequality (4), is a parameter that affects the wavelength range for securing the diffraction efficiency. The observation optical system 1000 is generally required to have diffraction efficiency in the visible range of 400 to 700 nm. For this purpose, the Abbe number difference may be 5 or more. In a case where it is less than 5, the difference in diffraction efficiency within the visible range becomes large.

In this embodiment, the refractive indices n1 and n2 are 1.49171 and 1.44500, respectively. The Abbe numbers v1 and v2 are 57.4 and 39.0, respectively. That is, the values |n1-n2| and |v1-v2| are 0.04671 and 18.4, respectively, and satisfy inequalities (1) and (2).

The relative relationship between the Abbe numbers of the base material and the optical coating material, defined by inequalities (5) and (6), is a parameter that affects the order of the base material and the optical coating material. Since the observation optical system 1000 is required to reduce the number of lenses and the size, the pupil-side optical system 1100 may include a single lens in which a base material and an optical coating material are integrated. In that case, the base material and the optical coating material are arranged in this order from the pupil in view of the condition for disposing the optical coating material on the non-pupil-side surface. The above relationship may be satisfied from the condition that the diffraction grating has a convex surface facing the panel unit 1400 side, because the diffractive optical element has positive refractive power for correcting chromatic aberration.

The pupil-side optical system 1100 may include a single integrated lens or a plurality of lenses. An antifouling glass may be provided on the pupil-side surface. In that case, the optical coating material and the base material may be arranged in this order from the pupil.

The Abbe numbers of the base material and the optical coating material, defined by inequalities (7) and (8) indicate a combination of glass materials that can easily achieve the relative relationship of the Abbe numbers expressed in inequality (2). The number of available resin optical materials is smaller than that of glass optical materials, so it is difficult to fine-adjust the diffraction grating and imaging performance during optical design. In the range that satisfies inequalities (7) and (8), the number of available resin optical materials is relatively large and suitable for fine-adjusting the optical design.

The minimum grating pitch Pmin defined by inequality (9) is a parameter that affects the mold for molding the base material. In a case where the minimum grating pitch Pmin is less than 0.01 mm, the mold process becomes difficult.

Figure 5A:
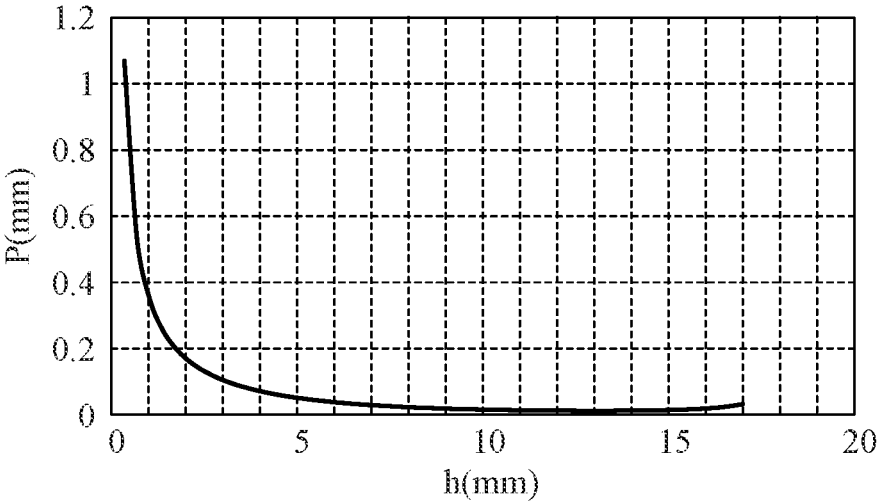
FIGS. 5A and 5B illustrate a grating pitch.
Figure 5B:
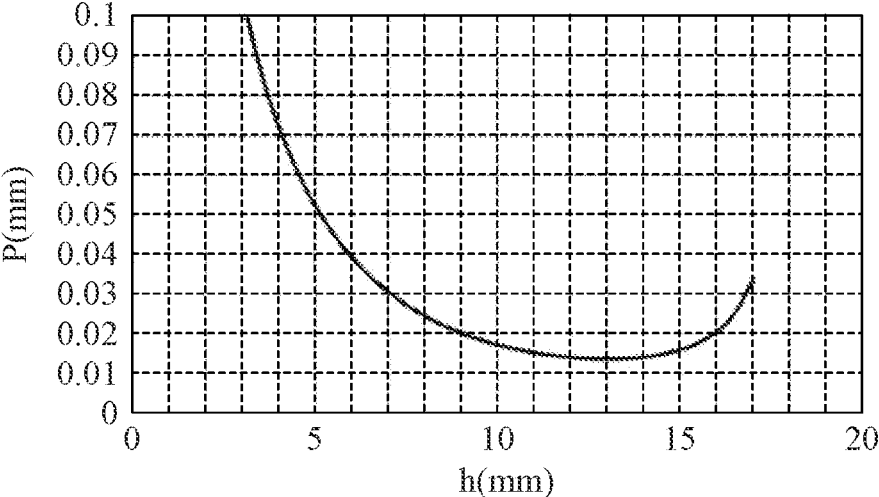

FIG. 5A illustrates a grating pitch P in this embodiment. FIG. 5B is an enlarged scale of the vertical axis of FIG. 5A. As illustrated in FIG. 5B, in this embodiment, the minimum grating pitch Pmin is 0.0137 mm, which satisfies inequality (9).

The number N of annuli defined by inequality (10) is a parameter that affects the manufacturing time of the mold for molding the base material. In a case where the number N of annuli is not 1000 or less, the mold process takes time and the risk of processing errors increases. The optical design may be adjusted using a high-order diffraction coefficient that defines the diffraction grating. The number N of annuli in the diffraction grating in this embodiment is 414, which satisfies inequality (10).

Inequalities (3), (4), (7), (8), and (10) may be replaced with inequalities (3a), (4a), (7a), (8a), and (10a) below:

$$0.02 < |n1 - n2| < 0.10 \tag{3a}$$

$$15 < |v1 - v2| \tag{4a}$$

-continued $$40 < v1 < 60 \tag{7a}$$

$$18 < v2 < 30 \tag{8a}$$

$$N \le 700 \tag{10a}$$

Numerical examples corresponding to this embodiment will be illustrated below.

In surface data of each numerical example, r represent a radius of curvature of each optical surface, and d (mm) represents an on-axis distance (distance on the optical axis) between an m-th surface and an (m+1)-th surface, where m is a surface number counted from the light incident side. nd represents a refractive index for the d-line of each optical element, and vd represents an Abbe number of the optical element based on the d-line. The Abbe number vd of a certain material is expressed as follows:

$$vd = (Nd - 1)/(NF - NC)$$

where Nd, NF, and NC are refractive indices based on the d-line (587.6 nm), the F-line (486.1 nm), and the C-line (656.3 nm) in the Fraunhofer line, respectively. The effective diameter represents the maximum diameter of the area through which light from the original image passes on each optical surface.

In a case where the optical surface is aspherical, an asterisk * is attached to the right side of the surface number. The aspherical shape is expressed as follows:

$$x(h) = \frac{\left(\frac{h^2}{r}\right)}{1 + \sqrt{\left\{1 - (1+k)\left(\frac{h}{r}\right)^2\right\}}} + A_4 h^4 + A_6 h^6 + A_8 h^8 + A_{10} h^{10} + \ldots$$

where x is a displacement amount from a surface vertex in the optical axis direction, h is a height from the optical axis in a direction orthogonal to the optical axis, R is a paraxial radius of curvature, K is a conic constant, and A4, A6, A8, and A10 are aspheric coefficients. "e±XX" in each aspheric coefficient means "×10^{±XX}".

Various data include a focal length (mm), an F-number, half an angle of view (°), an image height (mm), etc.

A phase shape F(h, m) of the DOE at a radial distance h from the optical axis is expressed as follows:

$$F(h, m) = (2\pi/m\lambda 0)(C1 h2 + C2 h4 + C3 h6 \ldots)$$

where m is a diffraction order, $\lambda 0$ is a reference wavelength, and C2i (where i is a natural number) is a phase coefficient of the 2i-order term.

At this time, a refractive power $\varphi$ of the diffraction surface of the DOE for any wavelength $\lambda$ and an arbitrary diffraction order m is expressed by the following equation using the phase coefficient C1.

$$\varphi(\lambda, m) = -2C1 m\lambda/\lambda 0$$

In the DOE according to this embodiment, the diffraction order m of the diffracted light is 1, and the design wavelength λ0 is the d-line (587.6 nm).

Numerical Example

| Surface No. | r | d | nd | vd | Effective Diameter |
|---|---|---|---|---|---|
| 1* | ∞ | 12.00 | | | 6.00 |
| 2 | ∞ | 1.72 | 1.49171 | 57.4 | 34.00 |
| 3 (diffraction) | −82.440 | 0.50 | 1.44500 | 39.0 | 34.00 |
| 4* | −82.440 | 0.50 | | | 34.00 |
| 5 | ∞ | 8.72 | 1.54390 | 56.0 | 38.00 |
| 6* | −43.630 | −8.72 | | | 38.00 |
| 7 | ∞ | −0.50 | | | 38.00 |
| 8* | −82.440 | 0.50 | | | 34.00 |
| 9 | ∞ | 8.72 | 1.54390 | 56.0 | 38.00 |
| 10* | −43.630 | 1.50 | | | 38.00 |
| Image Plane | ∞ | | | | |

UNIT: mm
SURFACE DATA

Aspheric Data

3rd Surface

K = 0.00000e+00, A4 = 1.59785e−05, A6 = −1.31622e−08

3rd Surface (Diffraction Surface)

C2 = −7.28000e−04, C4 = −5.96000e−06,
C6 = 8.36000e−09, C8 = 4.36956e−11
C10 = −7.44942e−14

4th Surface

K = 0.00000e+00, A4 = 1.59785e−05, A6 = −1.31622e−08

6th Surface

K = −1.40265e+00, A4 = 8.30149e−07

8th Surface

K = 0.00000e+00, A4 = 1.59785e−05, A6 = −1.31622e−08

10th Surface

K = −1.40265e+00, A4 = 8.30149e−07

Focal Length 15.59

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This embodiment can provide an optical system and a display apparatus, each of which can improve the sense of the definition of an image.

This application claims the benefit of Japanese Patent Application No. 2022-209721, filed on Dec. 27, 2022, hereby incorporated by reference herein in its entirety.

What is claimed is:

1. An optical system configured to guide a light beam from an image display element to an exit pupil, the optical system comprising, in order from an exit pupil side to an image display element side:

a first transmissive reflective surface;

a second transmissive reflective surface; and an optical element disposed closer to the exit pupil than the first transmissive reflective surface, wherein the optical element includes, in order from the exit pupil side to the image display element side, a first optical element made of a first optical material and a second optical element made of a second optical material different from the first optical material, wherein the first optical element and the second optical element are cemented together, and a diffraction grating is formed on a cemented surface of the first optical element and the second optical element, wherein the diffraction grating includes a grating surface contributing to diffraction and a grating wall surface adjacent to the grating surface in a radial direction, the grating surface having a convex shape facing the image display element side, and wherein the following inequalities are satisfied:

$$0.5 \le d1 \le 20.0$$

$$0.02 \le d2 \le 0.40$$

where d1 [mm] is a thickness of the first optical material in an optical axis direction, and d2 [mm] is a thickness of the second optical material in the optical axis direction.

2. The optical system according to claim 1, wherein the first optical material is a thermoplastic resin.

3. The optical system according to claim 1, wherein the second optical material is a UV curable resin.

4. The optical system according to claim 1, wherein the following inequality is satisfied:

$$0.02 \le |n1 - n2| \le 0.20$$

where n1 is a refractive index of the first optical material for d-line, and n2 is a refractive index of the second optical material for the d-line.

5. The optical system according to claim 1, wherein the following inequality is satisfied:

$$5 \le |v1 - v2|$$

where v1 is an Abbe number based on d-line of the first optical material, and v2 is an Abbe number based on the d-line of the second optical material.

6. The optical system according to claim 1, wherein the following inequalities are satisfied:

$$n1 > n2$$

$$v1 > v2$$

where n1 is a refractive index of the first optical material for d-line, n2 is a refractive index of the second optical material for the d-line, v1 is an Abbe number based on the d-line of the first optical material, and v2 is an Abbe number based on the d-line of the second optical material.

7. The optical system according to claim 1, wherein the following inequalities are satisfied:

$$25 \leq \nu 1 \leq 60$$

$$18 \leq \nu 2 \leq 40$$

where $\nu 1$ is an Abbe number based on d-line of the first optical material, and $\nu 2$ is an Abbe number based on the d-line of the second optical material.

8. The optical system according to claim 1, wherein the following inequality is satisfied:

$$0.001 \leq h \leq 0.020$$

where h [mm] is a grating height of the diffraction grating.

9. The optical system according to claim 1, wherein the following inequality is satisfied:

$$0.01 \leq P\text{min}$$

where Pmin [mm] is a minimum grating pitch of the diffraction grating.

10. The optical system according to claim 1, wherein the following inequality is satisfied:

$$N \leq 1000$$

where N is the number of annuli of the diffraction grating.

11. The optical system according to claim 1, wherein the first optical material has pencil hardness higher than 3H, and the second optical material has a pencil hardness lower than 3H.

12. The optical system according to claim 1, wherein an optical surface facing the exit pupil is made of acrylic resin.

13. The optical system according to claim 1, wherein a surface of the second optical material that faces the cemented surface is the first transmissive reflective surface.

14. A display apparatus comprising:

the optical system according to claim 1; and an image display element configured to display an image.

* * * * *